June 3, 1969

G. S. HAVILAND ET AL 3,447,838

ANTISKID SYSTEM FOR MOTOR VEHICLES HAVING AIRBRAKES

Filed Dec. 6, 1967

INVENTORS
GIRARD S. HAVILAND
MURRAY A. GERBER
FRANCIS W. STAGER
BY
Stephen J. Rudy
ATTORNEY

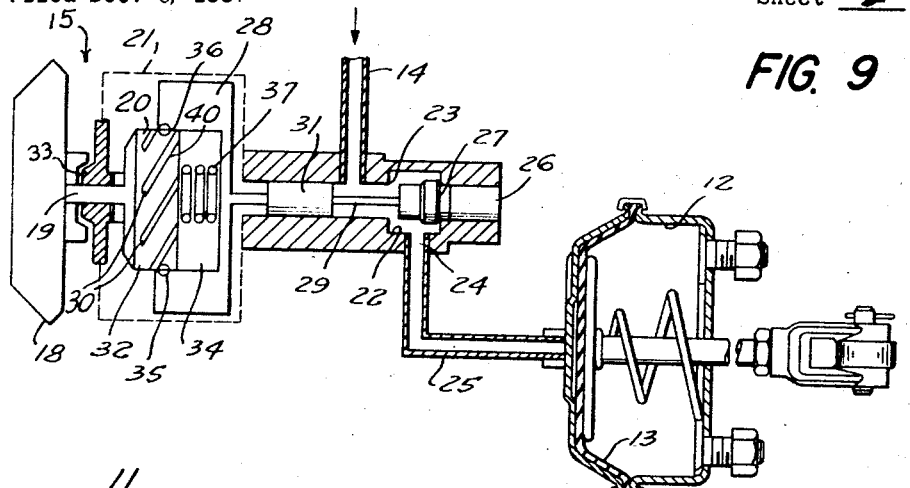
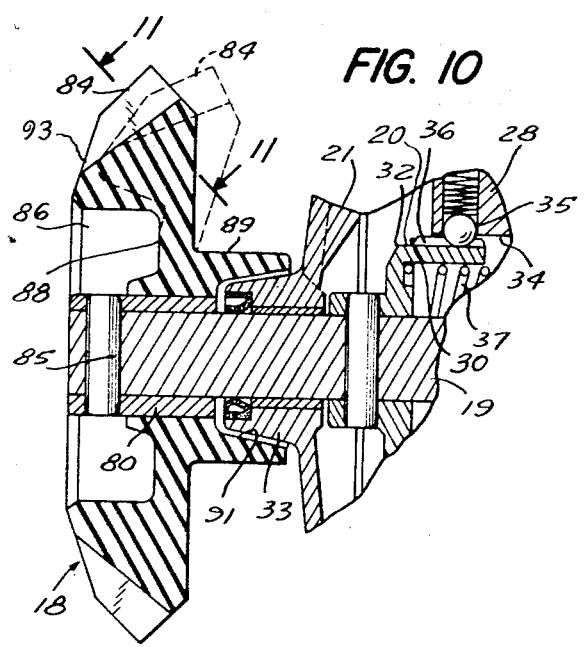
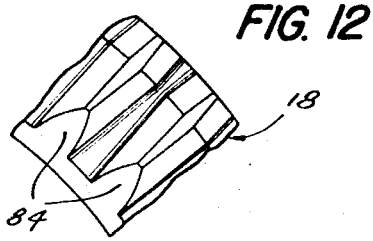
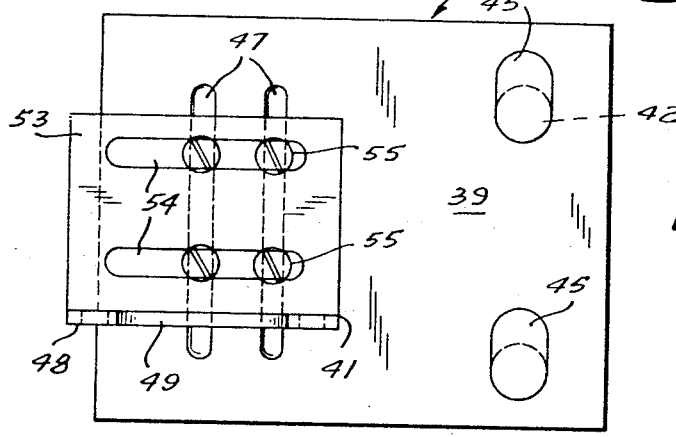

United States Patent Office 3,447,838
Patented June 3, 1969

3,447,838
ANTISKID SYSTEM FOR MOTOR VEHICLES HAVING AIRBRAKES
Girard S. Haviland and Murray A. Gerber, West Hartford, and Francis W. Stager, Stafford Springs, Conn., assignors to The Jacobs Manufacturing Company, West Hartford, Conn., a corporation of New Jersey
Filed Dec. 6, 1967, Ser. No. 688,427
Int. Cl. B60t 8/02; F16h 57/06
U.S. Cl. 303—21
9 Claims

ABSTRACT OF THE DISCLOSURE

An antiskid system designed to sense and avoid wheel lock-up and consequent skidding of a wheel of a motor vehicle equipped with airbrakes. The system includes a skid sensing and brake control unit mounted upon a stationary part of the vehicle and interconnected in the usual airbrake service lie between the air pressure brake chamber of a particular wheel and the pressure air service tank. A rotary inertia flywheel mechanism in the unit is driveably associated by gearing with the wheel. The flywheel mechanism acts in response to rapid changes in deceleration occurring between the wheel and the vehicle to oscillate or rapidly shuttle an air service control valve between a normal condition allowing service air flow to the brake chamber and a reverse condition blocking service air flow and venting the brake chamber. This action of the flywheel and valve continues until the wheel is finally braked to a stop. A ring gear supported by a group of universal bracket elements to the rim of the wheel serves to transmit rotation of the wheel through a drive pinion of the control unit to the flywheel. A universal bracket mounting the control unit to the vehicle is adjustable according to the mounted position of the ring gear so as to properly mesh the pinion with the ring gear. The pinion and ring gear also cooperate with one another to be self-cleaning.

Background of the invention

The invention relates to an antiskid system for a motor vehicle, including skid sensing rotary mechanism operatively associated with the wheel of a vehicle and adapted upon sensing an imminent wheel lock-up condition to automatically control the braking torque being applied to the wheel so as to avoid such lock-up condition and consequent skidding of the wheel.

An antiskid system for motor vehicles is known from Patent 3,046,060. This known system includes driving mechanism designed to project into the interior of the brake drum of the wheel and to be operatively associated with gearing provided within the drum. Accordingly, it requires structural modifications to be made with respect to the brake drum of the wheel with which it is to be used; it is not suited for universal application.

A general objective of the present invention is to provide an antiskid system which may be tapped into the usual pressure air service line of the braking mechanism of a motor vehicle and is adapted to be assembled to the vehicle without structural modifications being made in the vehicle or to the wheel with which it is associated.

A further objective is to provide a driving gearing arrangement for transmitting rotation of a motor vehicle wheel to the antiskid system, which gearing may be anchored to the rim of the wheel.

Another objective is to provide gearing of the foregoing nature which functions as it operates to prevent undesirable foreign matter from accumulating between its teeth.

A still further objective is to provide universal brackets which will permit association of the system with motor vehicle wheels of various diameters.

Brief description of the drawings

In the accompanying drawings:

FIG. 9 is a schematic diagram of the skid sensing and brake control unit as tapped in the pressure air service line;

FIG. 10 is a sectional view through the pinion gear and its mounting to the pinion shaft;

FIG. 11 is a fragmentary section on line 11—11 of FIG. 10;

FIG. 12 is a fragmentary face view of the pinion teeth; and

FIG. 13 is a plan detail of the mounting bracket for the skid sensing and brake control unit.

Description of preferred embodiment of the invention

Figure 1:
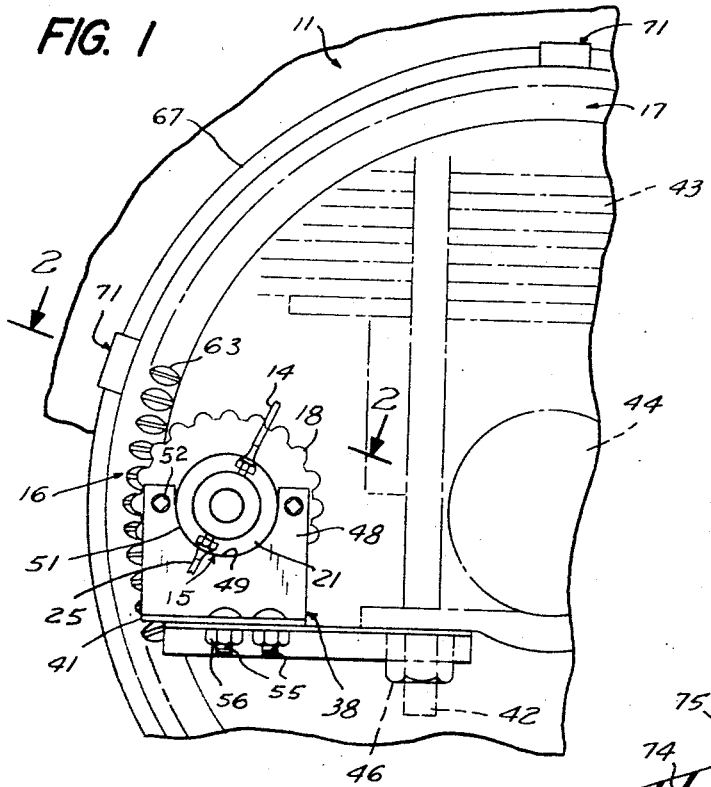
FIG. 1 is a view of an antiskid system illustrating the invention in association with a wheel of a motor truck vehicle.
Figure 3:
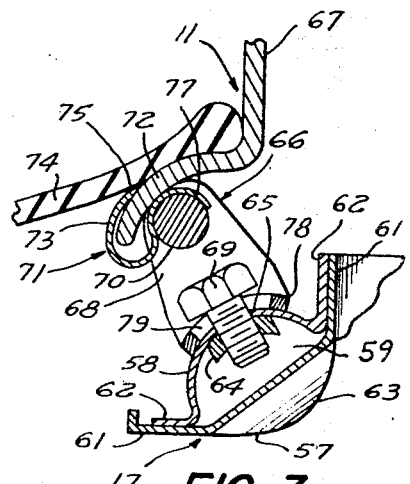
FIG. 3 is an enlarged detail of one of the mounting brackets associating the ring gear with the wheel.
Figure 2:
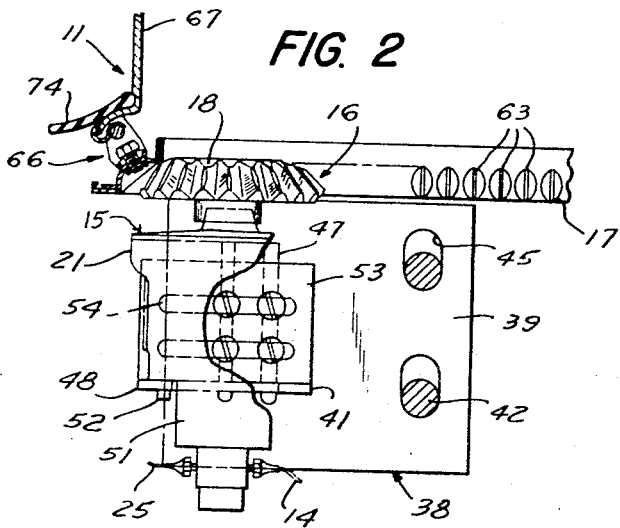
FIG. 2 is a section on line 2—2 of FIG. 1.
Figure 5:
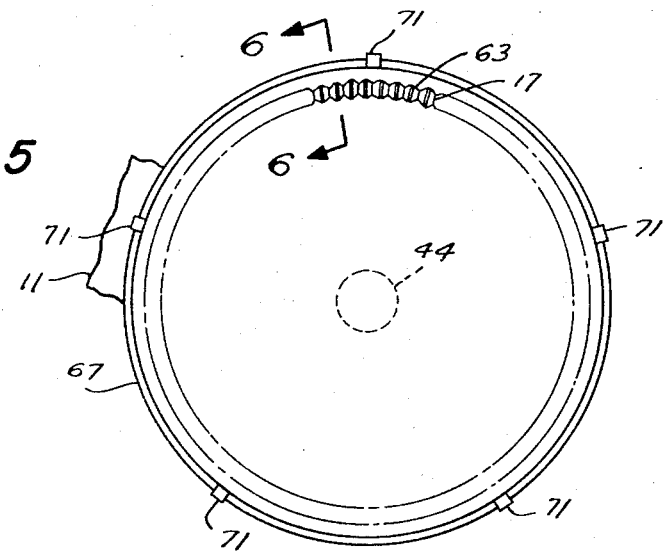
FIG. 5 is a view in front elevation of the ring gear including the arrangement of the brackets mounting it to the wheel rim.
Figure 4:
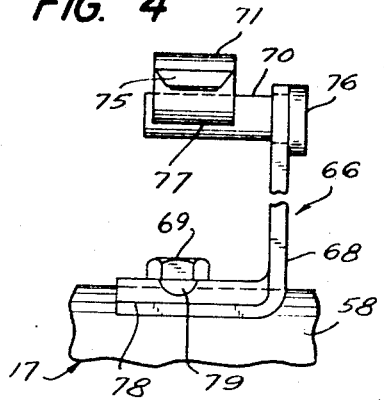
FIG. 4 is a detail of the mounting bracket in side elevation.
Figure 6:
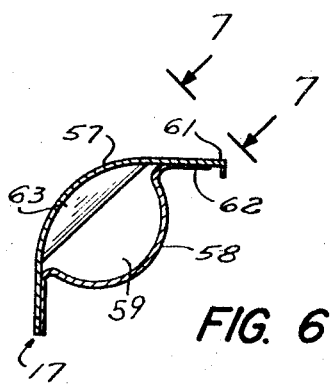
FIG. 6 is a section on line 6—6 of the ring gear in FIG. 5, the section being rotated clockwise 90°.
Figure 7:
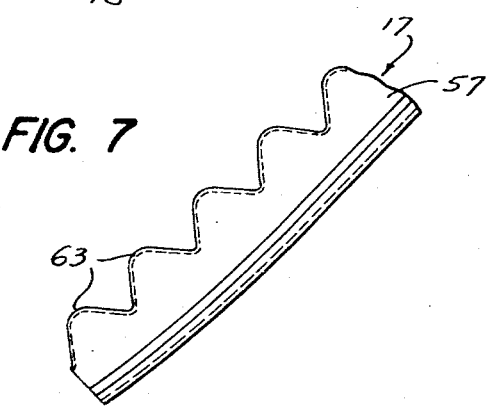
FIG. 7 is a fragmentary detail of the geared surface of the ring gear looking in the direction of the arrows 7—7 in FIG. 6.

Reference is directed to the drawings, wherein an antiskid system (FIGS. 1, 2, 9) illustrating the invention is shown as applied to one of the wheels 11 of a motor vehicle truck equipped with conventional air braking mechanism. The braking mechanism (FIG. 9) includes the usual pressure airbrake cylinder or chamber 12 having a diaphragm 13 which acts, when the chamber is pressurized, to cause application of the associated brakes in known manner to the wheel. The application of the brakes to stop the vehicle is under control of the operator. When he actuates the brake pedal, pressure air is fed in conventional manner from the usual service tank in the braking system over a feed line 14 to pressurize the brake chamber 12.

The antiskid system includes a skid detecting and brake control unit 15. It is adapted to be mounted to a suitable stationary support of the vehicle in the vicinity of the wheel. It is interconnected in the air feed line 14 and is operatively associated by means of gearing 16 to a wheel 11 of the vehicle. The gearing includes a beveled ring gear 17 carried by the wheel, which gear drivingly engages a beveled pinion 18 mounted to an externally projecting shaft 19 of the control unit 15.

The control unit 15 (FIGS. 1, 2, 9) includes a housing 21 providing a valve chamber 22 interconnected in the feed line 14. An inlet port 23 to the valve chamber is connected to an end of the feed line 14; and an outlet port 24 from the valve chamber is connected by a line 25 to the brake pressure chamber 12. An exhaust port 26 located axially opposite the inlet port 23 connects the valve chamber to atmosphere. A spool valve 27 axially movable in the valve chamber relative to the inlet and exhaust ports has a normal position, as in FIG. 9, closing the exhaust port 26 and opening the inlet port 23 so that the feed line 14 is in communication with the outlet line 25 to the brake chamber. The valve has a reverse position closing the inlet port and opening the exhaust port so that the feed line 14 is shut off from the brake chamber 12 and the latter is open to the exhaust port 26.

A rotary inertia member or flywheel 28 controls movement of the valve from one position to the other. The flywheel is joined to the valve by means of an axially extending shaft 29. A sealing land 31 intermediately of the shaft prevents leakage of air from the inlet area of the valve chamber to the flywheel area of the housing. The flywheel is operatively associated with a cam gear 32. The flywheel is adapted to rotate with the cam gear; and at certain times is caused to override the latter in an axial direction. The cam gear is fixed to the pinion shaft 19 for rotation with the pinion 18. It is restrained by an intermediate hub 33 of the housing 21 against axial movement. The flywheel has a central recess 34 in which the cam gear is receivable as the flywheel overrides the latter in one direction. The flywheel is mounted to the periphery of the cam gear by means of spring loaded balls 35 which are engaged to ride in helical grooves 36 formed in the periphery of the cam gear. A spring 37 biases the flywheel to a normal position at one end of the cam gear, as in FIGS. 9 and 10, in which position the valve 27 is held closed over the exhaust port 26. In overriding the cam gear, it is apparent that the flywheel will carry the spring loaded balls 35 out of the grooves 36 onto a land 20 immediately forwardly of cam surfaces 30 at the ends of splines 40. The splines 40 define the grooves. The distance of forward movement of the flywheel is determined by the axial extent that the valve 27 must move between the inlet and exhaust ports to close from one upon the other. It can be seen that, upon attaining its forward position, the flywheel will be free of the load of the cam gear; and, during the period that its velocity exceeds that of the cam gear, the flywheel will centrifugally carry the balls about the land 20 ratcheting the balls over the cam surfaced ends 30 of the splines as it does so. Upon the velocity of the flywheel and cam gear matching each other, the detent balls 35 will be re-entered into the grooves 36 as the flywheel is returned to its normal position by spring 37. It can be appreciated that the valve 27 will be held unseated from the exhaust port for the interval of time required to restore the flywheel to its normal position.

In the operation of the system, when the operator has actuated the brake pedal in usual manner to stop the vehicle, service air is caused to flow through the feed line 14 to pressurize the brake chamber 12 causing the brakes to be applied to the wheel 11 and, under normal conditions, cause the wheel to stop without skidding. But if the pressure being applied to the brake chamber should cause the wheel to rapidly decelerate relative to the deceleration of the vehicle so as to make a wheel lock-up condition imminent with consequent skidding, the resultant forces transmitted through the gearing 16 to the cam gear 32 will cause the flywheel to axially override the cam gear against the bias of the spring 37. In this action, the flywheel will pull the valve 27 closed over the inlet port 23 to simultaneously shut off pressure air flow to the brake chamber 12 and open the latter to the exhaust port 26. This action will relax the braking torque on the wheel and will avoid a wheel lock-up condition as the wheel is permitted to again roll freely. Consequent increase in acceleration transmitted to the cam gear by the freely rolling wheel, together with the bias of the return spring 37 will cause the flywheel to axially override the cam gear back to its normal FIG. 9 position to reclose the valve 27 over the exhaust port 26 and to re-open the feed line 14 to the brake chamber 12. This cycle of applying and relaxing braking torque is rapidly repeated until the wheel finally comes to a stop without accompanying skidding. The cycling action occurs at a frequency of several times per second so that in effect the valve 27 oscillates rapidly relative to the inlet and exhaust ports until the vehicle is finally braked to a stop.

The control unit 15 is mounted by means of an adjustable universal bracket 38 (FIGS. 1, 2, 13) to the vehicle. This bracket comprises a base plate 39 and an L-formed carrier member 41 mounted thereon. The base plate is fastened to a suitable stationary part of the vehicle in the vicinity of the wheel 11 of the vehicle. Here, it is rigidly fastened to one of the U-bolts 42 that secure the vehicle's springs 43 to the axle 44 of the vehicle. The base plate is provided with a pair of apertures 45 through each of which one of the arms of the U-bolt is passed. The usual nuts 46 of the U-bolt are drawn tightly against the base plate to rigidly secure its position. The base plate extends from the U-bolt in a horizontal plane so that a pair of parallel slots 47 therein extend in an axial direction relative to the wheel. The L-formed carrier member 41 has one plate arm 48 provided with a concavity 49 which fits about a cylindrical portion 51 of the housing 21 of the control unit. Bolts 52 secure the arm 48 to the housing. The other plate arm 53 of the carrier member overlies the base plate 39. It is provided with a pair of parallel slots 54 which extend transversely of the slots 47 of the base plate. In this arrangement of the bracket plates, the carrier member 41 may be adjustably slid relative to the base plate 39 so as to carry the control unit 15 in directions axially and transversely relative to the wheel 11 and ring gear 17 until the pinion 18 of the detector unit meshes properly with the ring gear 17. A pair of bolts 55 passed through the slots of both the base plate and carrier and drawn tightly by means of nut elements 56 fix the members of the bracket and the control unit in a finally adjusted position.

The ring gear 17 is of tubular form, fashioned from metal, such as stainless steel. It comprises (FIGS. 3-8) a pair of annular convexed shell members 57 and 58 positioned with their convexed portions in opposed relation to provide a vacant annular area 59 between them. The members 57 and 58 are respectively formed with marginal flanges 61 and 62 which overlie one another and are fixed together in suitable manner, as by welding. The individual members 57 and 58 are formed in economical manner, as by stamping. The outer member 57 has a ring of teeth 63 stamped about its convexed portion defining a bevel gear formation engageable with the pinion 18. The inner or back member 58 serves as a strengthening rib to the outer member 57 whereby the form of the ring gear is rigidly maintained without possibility of distortion. At equally spaced points circumferentially of member 58 a plate nut 64 is rigidly secured to the concaved inner wall of the back member and registers with a bolt receiving aperture 65 through the wall of the back member 58.

A plurality of universal brackets 66, here five in number, one to be associated with each plate nut, is provided to mount and rigidly hold the ring gear to the rim 67 of the wheel in close relation to the wheel and in substantially concentric relation to the rim. Each bracket 66 includes a spacer plate 68; a headed bolt 69 for threadedly securing one end of the spacer plate 68 to a separate one of the plate nuts; and a clip 71 pivoted by means of a pin 70 to the opposite end of the spacer plate and adapted to be anchored to the inner annular flange 72 of the wheel rim. The clip 71 is of general S-form and fashioned of hard metal. One hooked end 73 of the clip is adapted to be pressed fitted over the rim flange 72 in such manner that its terminal portion extends between the inside wall of the flange and the adjacent wall of the wheel tire 74, as best appears in FIG. 3. The outer surface of the terminal end of the hook 73 is tapered as at 75 to provide a non-biting edge adjacent the tire. The pivot pin 70 is headed at one end 76 and its shank projects with a loose fit through an aperture of the spacing plate. The other hooked end 77 of the clip is fixed, as by welding, about the shank of the pivot pin. The spacer plate 68 is formed at its other end with an arcuate flange 78 which is adapted to seat over the convexed surface of the back member 58 of the ring gear. This flange is provided with an arcuate slot 79 through which the shank of the bolt 69 is freely passable to engage with its corresponding plate nut 64. The slot is concentric with the convexed surface of the back member of the ring gear; and is sufficiently elongated to permit swinging of the spacing plate relative to the ring gear and bolt 69 when the bolt is loosely engaged with its plate nut. In this arrangement, it can be seen that each spacing plate is angularly pivotable at one end relative to the ring gear and at the other end relative to the clip until the several bolts are securely tightened.

Figure 8:
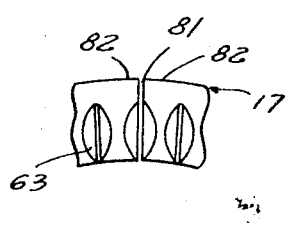
FIG. 8 is a detail showing a split made through the ring gear to facilitate its assembly about the wheel axle.

To mount the ring gear to the wheel, it is first split radially through one of its teeth as indicated at 81 in FIG. 8. This is done to avoid removing the wheel from the axle 44 of the wheel. The split ends 82 are then flexed or sufficiently spread apart to permit them to be passed about the axle 44. The split ends are then drawn together and resecured in abutting end relation in suitable manner; such as by welding, or by other suitable means. Next, each clip 71 is initially bolted loosely by means of its bolt 69 to one of the plate nuts 64 and hooked end 73 of the clip is anchored to the flange 72 of the wheel rim 67. The bolts 69 are then progressively tightened until the ring gear obtains a fixed position in proper beveled mesh with the pinion. The several clips are identical and equally spaced about the wheel rim so that when the ring gear is finally assembled to the rim and the several bolts tightened, the ring gear will be held fixed in close relation to the wheel, and in substantially concentric relation to the wheel rim. The even and balanced disposition of the brackets 66 about the wheel rim and ring gear prevent pivoting or movement of the ring gear from this fixed position after the bolts 69 have been tightened.

The structural nature of the mounting brackets 66 for the ring gear permits them to mount a ring gear of a specific diameter to wheel rims of various diameters within a limited range as determined by the length of the spacing plate 68. When the ring gear is mounted to a wheel rim of greater diameter, it will be held by the brackets closer to the rim than when mounted to a rim of smaller diameter. In the case of the larger rim, the spacing plates are caused to be swung inwardly during assembly; whereas in the case of the smaller rim the spacing plates are caused to be swung further outwardly.

It is apparent that the adjustable L-form carrier member 41 of bracket 38 supporting the control unit 15 would have to be adjusted so as to draw the unit axially further toward the wheel in the case of rims of greater diameter and reversely in the case of rims of lesser diameter.

The pinion 18 and the ring gear 17 are of such structure that they cooperate with one another to clean themselves of dirt, stones and debris that might be thrown between them in the course of operating the vehicle.

The ring gear 17, as earlier mentioned, is formed of hard metal such as stainless steel. The teeth 63 which are formed about the convexed surface of the front shell member 57 of the gear are in the mounted position of the ring gear at a forty-five degree bevel angle. They are deep and rounded. In this form, dirt, stones and debris tend to slip from between the teeth and are normally prevented from becoming lodged therein as the wheel rotates. Should small stones or mud cling between the teeth of the ring gear, they will become dislodged as they are carried by the ring gear into engagement with the teeth 84 of the pinion gear.

The pinion 18 is moulded from material that is resilient and flexible at low temperatures and has high abrasive and wear resistant properties such as rubber. Its teeth 84 (FIGS. 10-12) are designed for sure meshing with those of the ring gear. They are also deep and rounded; and are of forty-five degree bevel and pitch cone design. The pinion is moulded about and bonded to an axial sleeve 80. The pinion is mounted by means of the sleeve upon an externally projecting portion of shaft 19 of the control unit 15. A pin 85 fixes the sleeve to the shaft. The body of the pinion is formed so that its teeth 84 can yield angularly backwards, as indicated in broken line in FIG. 10, upon engaging debris between the teeth of the ring gear and at the same time provide an upward angular force tending to dislodge the debris. Toward this end, the central area of the inner face of the pinion body is deeply recessed as at 86. This construction results in the provision of a relatively narrow annular web 88 intermediately of the pinion hub 89 and the teeth 84. This web facilitates angular flexing of the web toward and away from the hub. The hub 89 extends axially rearward and is provided with an axial annular recess 91, the wall of which diverges slightly outward and surrounds with slight clearance a mating hub 33 of the hard metal housing 21. By means of this construction, when a segment of the teeth 84 of the pinion has been pressured inwardly, as indicated in broken line in FIG. 10, by debris lodged in the teeth of the ring gear, it yields angularly and flexes the web. In this action, forces of compression are developed in the web. As a result, a strong upward angular force develops in the minor diameter area 93 of the yielding teeth 84 against the debris tending to force the debris upwardly and out from between the teeth of the ring gear. The flexing action of the pinion also tends to eject any debris that may be picked up between its own teeth.

It is also feasible to form the ring gear of flexible resilient material, such as rubber, and to form the pinion of hard or solid material, such as metal.

The anti-skid system has been described and illustrated as applied to but one of the wheels of the vehicle. In practice, the system will include a separate control unit 15 associated with each wheel of the vehicle, or at least with each of two of the wheels. Each of the units 15 will be interconnected by means of an individual branch line with the main pressure air feed line 14.

What is claimed is:

1. An antiskid system for controlling the application of braking torque to a motor vehicle wheel to avoid wheel lock-up, said wheel having a wheel rim formed with an annular flange about a side thereof, the system including a braking torque control unit having a beveled pinion drive, an adjustable first bracket for adjustably mounting the unit to a fixed support of the vehicle in a precisely selected axially spaced position relative to a side of the wheel, a separate ring gear detachably mountable to the flange of the wheel rim and drivingly engageable with the pinion for transmitting rotation of the wheel directly to the pinion, and a plurality of ring gear adjustable bracket means spaced in balanced relation about the ring gear for adjustably suspending the ring gear externally of the wheel to the flange of the wheel rim in a fixed position in axially spaced relation to the wheel rim for a precisely selected driving engagement with the pinion.

2. An antiskid system for controlling the application of braking torque to a motor vehicle wheel to avoid wheel lock-up, said wheel having a wheel rim, the system including a braking torque control unit having a pinion drive, a first bracket for mounting the unit to a fixed support of the vehicle in the vicinity of the wheel, a ring gear drivingly engageable with the pinion for transmitting rotation of the wheel directly to the pinion, and a plurality of ring gear brackets spaced in balanced relation about the ring gear for mounting the ring gear externally of the wheel in a fixed position to the wheel rim, wherein each ring gear bracket includes a spacer element, a clip pivoted to one end of the spacer element and engageable with the wheel rim, a headed bolt at the opposite end of the spacer element threadedly engageable with the ring gear, and the spacer element having slotted means loosely receiving the shank of the bolt permitting relative angular adjustment of the spacer element to the bolt and ring gear.

3. An antiskid system as in claim 2, wherein the ring gear brackets are angularly adjustable relative to the wheel rim and to the ring gear permitting universal application of the ring gear to wheel rims of various diameters, and the brackets include means for fixing the brackets in their adjusted condition.

4. An antiskid system as in claim 2, wherein the first bracket comprises a base plate adapted to be mounted to a support of the vehicle, a carrier member carrying the control unit, and means mounting the carrier member to the base plate permitting selective adjustable positioning of the carrier member axially or transversely of the base plate.

5. An antiskid system controlling the application of braking torque to a motor vehicle wheel carried by an axle so as to avoid a wheel lock-up condition, the wheel having a wheel rim formed with an annular inner flange disposed adjacent an inner face of a tire mounted upon the wheel rim, the system comprising a skid sensing and brake control unit having an externally projecting driving pinion, a first bracket detachably mounting the unit to a stationary support of the vehicle, a ring gear disposed substantially co-axially with the axle between the wheel and the pinion in driving engagement with the pinion, and a plurality of bracket elements spaced about the ring gear detachably suspending the ring gear to the flange of the wheel rim in a position substantially concentric with and in axially spaced relation to the wheel rim.

6. An antiskid system as in claim 5, wherein the ring gear is adapted to be split through and the free ends defined by the split are subject to flexing so as to enable selective assembly or disassembly of the ring gear relative to the axle.

7. An antiskid system for controlling the application of braking torque to a motor vehicle to avoid wheel lock-up, said wheel having a wheel rim formed with an annular flange about a side thereof adjacent an inner face of a tire mounted upon the wheel, the system including a skid sensing and braking torque control unit having an externally projecting beveled pinion drive, bracket means carried by the control unit detachably mountable to a support of the vehicle for supporting the control unit in axially spaced relation to the wheel, a separate ring gear disposable between the control unit and the wheel drivingly engageable with the pinion drive, and other bracket means carried by the ring gear detachably mountable to the flange of the wheel rim for supporting the ring gear to the said flange in axially spaced and substantially concentric relation to the wheel.

8. In an antiskid system controlling the application of braking torque to a motor vehicle wheel so as to avoid a wheel lock-up condition, including a valve shiftable between a normally closed condition over an exhaust port and a reverse position closed over an inlet port in a common valve chamber having an outlet port connected with an air-brake pressure chamber, a flywheel having a connection with the valve for moving the valve from one closed condition to the other, a rotatable shaft adapted by gearing for connection to a wheel so as to receive the rotation of the wheel, detent balls carried by the flywheel, a cam gear fixed upon the shaft, and helical grooves defined by helical splines about the cam gear engaged by the detent balls for transmitting rotation of the cam gear to the flywheel, a peripheral land about the cam gear adjacent forward ends of the splines, the flywheel having a normal position on the cam gear under the bias of a return spring wherein the detent balls are located in a rear area of the grooves, and the flywheel being angularly and axially movable relative to the cam gear as a consequence of sudden deceleration of the cam gear so as to carry the detent balls out of the grooves onto the land, and the valve attaining with the movement of the flywheel its reverse position upon the detent balls obtaining a position on the land.

9. In an antiskid system as in claim 8, wherein the forward end of each of the splines defining the grooves is characterized by a cam surface.

References Cited
UNITED STATES PATENTS

| | | | |
|---|---|---|---|
| 1,127,123 | 2/1915 | Walker | 180—75 X |
| 1,181,079 | 4/1916 | Kelso. | |
| 2,017,139 | 10/1935 | Wood. | |
| 3,046,060 | 7/1962 | Stager et al. | 303—21 |

FOREIGN PATENTS

| | | |
|---|---|---|
| 894,577 | 4/1962 | Great Britain. |

MILTON BUCHLER, *Primary Examiner.*

J. J. McLAUGHLIN, Jr., *Assistant Examiner.*

U.S. Cl. X.R.

74—13, 396, 411; 180—1; 188—181; 303—24